(12) United States Patent
Hewitt et al.

(10) Patent No.: US 10,613,747 B2
(45) Date of Patent: Apr. 7, 2020

(54) CREATING AND MANIPULATING LAYERS ON A USER DEVICE USING TOUCH GESTURES

(71) Applicant: INTERNATIONAL BUSINESS MACHINES CORPORATION, Armonk, NY (US)

(72) Inventors: James Hewitt, Eastleigh (GB); Mark J. Lawrence, Eastleigh (GB); Martin A. Ross, Gosport (GB); Caroline J. Thomas, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 96 days.

(21) Appl. No.: 15/405,890

(22) Filed: Jan. 13, 2017

(65) Prior Publication Data

US 2018/0203595 A1 Jul. 19, 2018

(51) Int. Cl.
*G06F 3/0488* (2013.01)
*G06F 3/0485* (2013.01)

(52) U.S. Cl.
CPC ........ *G06F 3/04883* (2013.01); *G06F 3/0485* (2013.01); *G06F 2203/04803* (2013.01)

(58) Field of Classification Search
CPC ............... G06F 3/0485; G06F 3/04883; G06F 2203/04803; G06F 3/04845
See application file for complete search history.

(56) References Cited

U.S. PATENT DOCUMENTS

| | | | |
|---|---|---|---|
| 7,496,829 B2 | 2/2009 | Rubin et al. | |
| 7,779,346 B2 | 8/2010 | Buczek | |
| 8,539,339 B2 | 9/2013 | Lloyd et al. | |
| 8,782,513 B2 | 7/2014 | Migos et al. | |
| 9,013,513 B2 | 4/2015 | Paolini et al. | |
| 9,195,780 B2 | 11/2015 | Thangappan | |
| 9,223,771 B2 | 12/2015 | Lehrian et al. | |
| 2012/0050184 A1* | 3/2012 | Yoo | G06F 3/038 345/173 |
| 2012/0240041 A1* | 9/2012 | Lim | G06F 3/0485 715/702 |

(Continued)

OTHER PUBLICATIONS

Marcos Sylos "Top five advantages of software as a service" (SaaS) Sep. 18, 2013 6 pages (Year: 2013).*

(Continued)

*Primary Examiner* — Andrea N Long
(74) *Attorney, Agent, or Firm* — Nicholas Bowman; Andrew D. Wright; Roberts Mlotkowski Safran Cole & Calderon, P.C.

(57) ABSTRACT

A computer-implemented method includes: receiving, by a user device, a first touch gesture at a display of the user device visually displaying a virtual object; defining, by the user device, an anchor point of the virtual object visually displayed on the display based on the first touch gesture; receiving, by the user device, a second touch gesture at the display; determining, by the user device, an anchor area and a scrolling area based on the anchor point and the second touch gesture; defining, by the user device, a first layer corresponding to the anchor area and a second layer corresponding to the scrolling area; and stacking, by the user device, the first layer over the second layer.

20 Claims, 6 Drawing Sheets

(56) References Cited

U.S. PATENT DOCUMENTS

2013/0086464 A1    4/2013  Thangappan
2013/0271498 A1*  10/2013  Poalini .................. G06F 3/0483
                                                       345/660
2014/0062976 A1*   3/2014  Park ........................ G09G 5/00
                                                       345/204

OTHER PUBLICATIONS

PC Magazine Encyclopedia Definition of: SaaS 2 pages (Year: 2013).*
Basu, "How to Freeze a Part of a Word Document for Easy Reference", http://www.makeuseof.com/tag/how-to-freeze-a-part-of-your-word-document-for-easy-reference/, Jun. 14, 2009, 15 pages.
Microsoft Excel, "Freeze Panes to lock rows and columns", https://support.office.com/en-us/article/Freeze-or-lock-rows-and-columns-3439cfe6-010c-4d2d-a3c9-d0e8ba62d724, Accessed Nov. 28, 2016, 7 pages.
IBM App Connect, https://staging.appconnect.ibmcloud.com/app/flow/new, Accessed Nov. 28, 2016, 4 pages.
"Place Images in Frozen Areas of Sheets", Drive Bunny, http://www.mousewhisperer.co.uk/drivebunny/place-images-in-frozen-areas-of-sheets/, Accessed Nov. 28, 2016, 5 pages.
List of IBM Patents or Patent Applications Treated as Related, dated Jan. 28, 2020, 1 page.
Specification "Creating and Manipulating Layers on a User Device Using Touch Gestures" and Drawings in related U.S. Appl. No. 16/748,046, filed Jan. 21, 2020, 34 pages.

* cited by examiner

CREATING AND MANIPULATING LAYERS ON A USER DEVICE USING TOUCH GESTURES

BACKGROUND

The present invention generally relates to creating and manipulating layers on a user device, and, more particularly, to creating and manipulating layers using user touch gestures.

Virtual objects, such as documents, images, spreadsheets, tables, etc., may be displayed on a user device (e.g., smartphones, tablet devices, laptops, and desktop computers). User devices may include touch screens via which a user may provide input for scrolling through a window, image, document, spreadsheet, webpage, application, and/or other virtual object (e.g., using a "swipe" gesture). For example, a user may use touch gestures (e.g., swipe gesture) to scroll left, right, up, down, diagonally, etc. to reveal additional sections of an image, document, or spreadsheet that may not currently be displayed on the user device. Also, a user may use touch gestures (e.g., "pinch" gestures) to zoom in or out on a virtual object displayed on the user device.

SUMMARY

In an aspect of the invention, a computer-implemented method includes: receiving, by a user device, a first touch gesture at a display of the user device visually displaying a virtual object; defining, by the user device, an anchor point of the virtual object visually displayed on the display based on the first touch gesture; receiving, by the user device, a second touch gesture at the display; determining, by the user device, an anchor area and a scrolling area based on the anchor point and the second touch gesture; defining, by the user device, a first layer corresponding to the anchor area and a second layer corresponding to the scrolling area; and stacking, by the user device, the first layer over the second layer.

In an aspect of the invention, there is a computer program product for creating and manipulating layers on a user device using touch gestures. The computer program product includes a computer readable storage medium having program instructions embodied therewith, the program instructions are executable by the user device to cause the user device to: receive a first touch gesture on a display of the user device; define an anchor point based on display coordinates corresponding to a location on the display in which the first touch gesture is received; receive a second touch gesture for scrolling through content displayed on the user device; determine an anchor area and a scrolling area based on the anchor point and the second touch gesture; define a first layer corresponding to the anchor area and a second layer corresponding to the scrolling area; and stack the first layer over the second layer.

In an aspect of the invention, a system includes: a CPU, a computer readable memory and a computer readable storage medium associated with a user device; program instructions to receive a first touch gesture; program instructions to define an anchor point based on the first touch gesture; program instructions to receive a second touch gesture including a swipe gesture for scrolling a portion of a virtual object presented on the user device; program instructions to determine an anchor area and a scrolling area based on the anchor point and a direction of the swipe gesture; program instructions to define a first layer corresponding to the anchor area and a second layer corresponding to the scrolling area; program instructions to stack the first layer over the second layer; program instructions to receive a subsequent swipe gesture after receiving the second touch gesture; and program instructions to scroll the scrolling area behind the anchor area based on receiving the subsequent swipe gesture. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
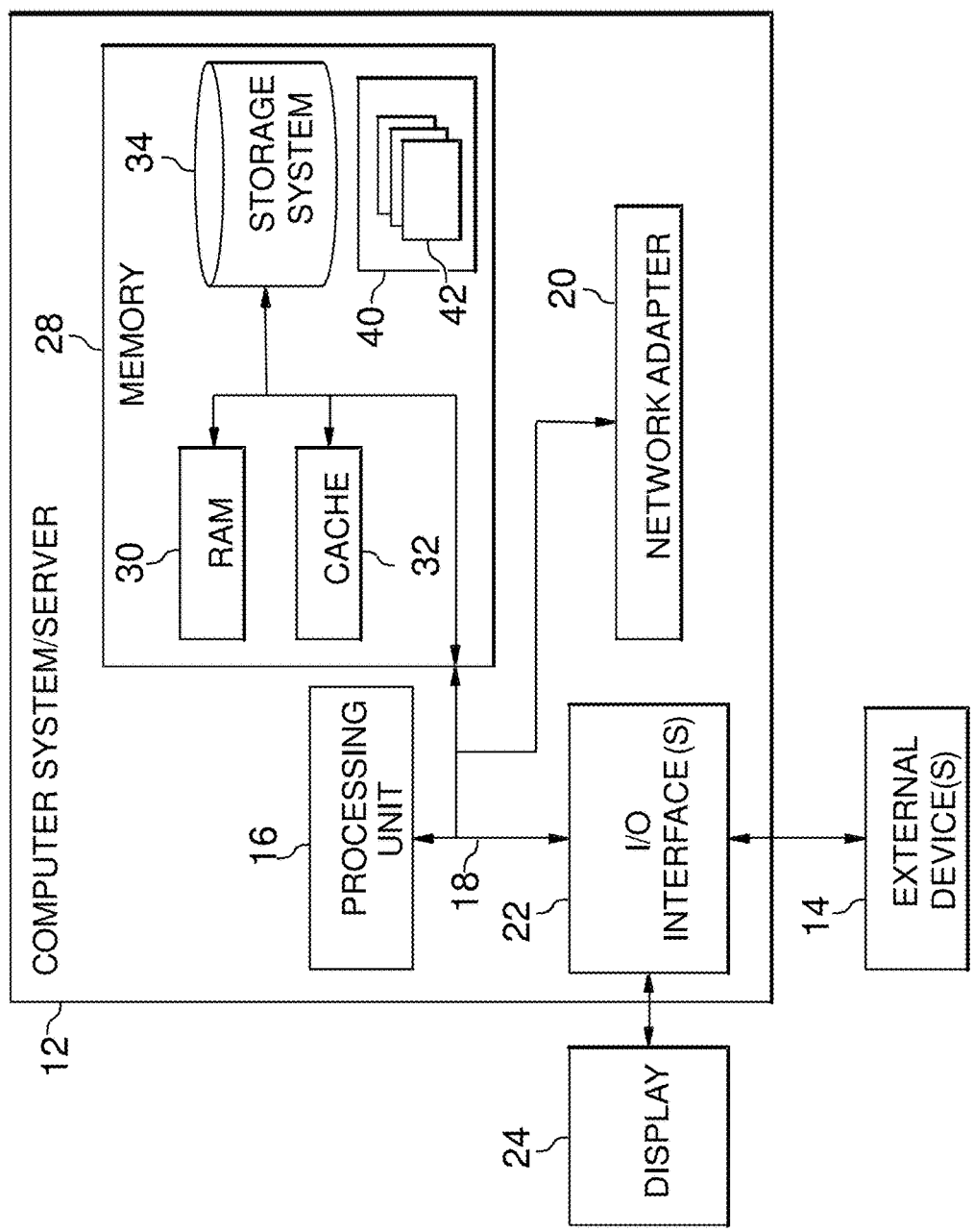
FIG. 1 shows an illustrative environment for managing the processes in accordance with aspects of the invention.

The present invention generally relates to creating and manipulating layers on a user device, and, more particularly, to creating and manipulating layers using user touch gestures. Aspects of the present invention may improve user experience when viewing a large virtual object that may not fit in its entirety on a user device display, or may need to be excessively "zoomed out" to fit the virtual object on the display to the point where the virtual object is difficult to see. Zooming in on a virtual object may improve the visibility of a portion of the virtual object, but would then hide other portions of the virtual object as the space or "real-estate" on the user device display may run out. Thus, a user may be unable to concurrently view multiple portions of the virtual object at the same time (e.g., columns of a spreadsheet at the opposite ends of the spreadsheet).

Accordingly, aspects of the present invention may improve user experience by "freezing" or "anchoring" a portion of a virtual object in place (e.g., using a touch gesture) such that the "frozen" or "anchored" portion of the virtual object remains static on a user device display as the user scrolls to reveal additional portions of the virtual object. In this way, a virtual object may be zoomed in order to view the object easily, while allowing the user to concurrently view different sections of the virtual object that would otherwise not be concurrently viewable without zooming out.

As described herein, one end of a virtual object (e.g., an image, document, or table), may be frozen so that an opposite end may be concurrently viewed. For example, a portion of an image may be anchored using a first touch gesture such that an anchored area of the image remains static for display while a remaining portion of the image may be scrolled using a second touch gesture (e.g., a swipe gesture). As another example, a portion of a table (e.g., rows or columns) may be anchored using a first touch gesture such that an anchored area of the table remains static for display while a remaining portion of the table may be scrolled using a second touch gesture (e.g., a swipe gesture).

As described herein, aspects of the present invention may define an "anchor point" based on a first touch gesture (e.g., point touch gesture when a single point on a user device display is touched). Further, aspects of the present invention may define a "context area" within a portion of the first touch gesture, an "anchor area" and a "scrolling area" based on a second gesture (e.g., a swipe gesture). The context area may include the boundaries of the virtual object (e.g., the boundaries of a table, boundaries of a text document or selected section of a text document, boundaries of an image, etc.) Additionally, or alternatively, the context area may include the boundaries of multiple virtual objects on a display, webpage, etc. (e.g., an image and text presented below the image). The anchor area may include an area within a context area on a virtual object that is anchored in place on a display of the user device. The scrolling area may include an area within the context area of the virtual object that may be scrolled (e.g., using subsequent swiping gestures). The scrolling area may be scrolled behind the anchor area such that the anchor area is at a higher layer above the scrolling area. In other words, aspects of the present invention may create layers using touch gestures. Further, the touch gestures may be used to manipulate a layer using touch gestures (e.g., scroll through layer defining a scrolling area).

As described herein, a swipe gesture after an anchor point has been defined may be used to define an anchor area, and a scrolling area. As an example, a swipe gesture from right to left would define an anchor area that is to the left of the anchor point and a scrolling area to the right of the anchor point. In this way, a user may concurrently view multiple sections of a context area (e.g., boundaries of a virtual object) that would otherwise not be viewable or only viewable when excessively "zoomed out." Further, aspects of the present invention may automatically determine the anchor area and scrolling area based on the direction of the user's swipe. That is, the user may only need to initially define an anchor point using a first touch gesture in order to anchor an area and scroll through a scrolling area behind the anchor area.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
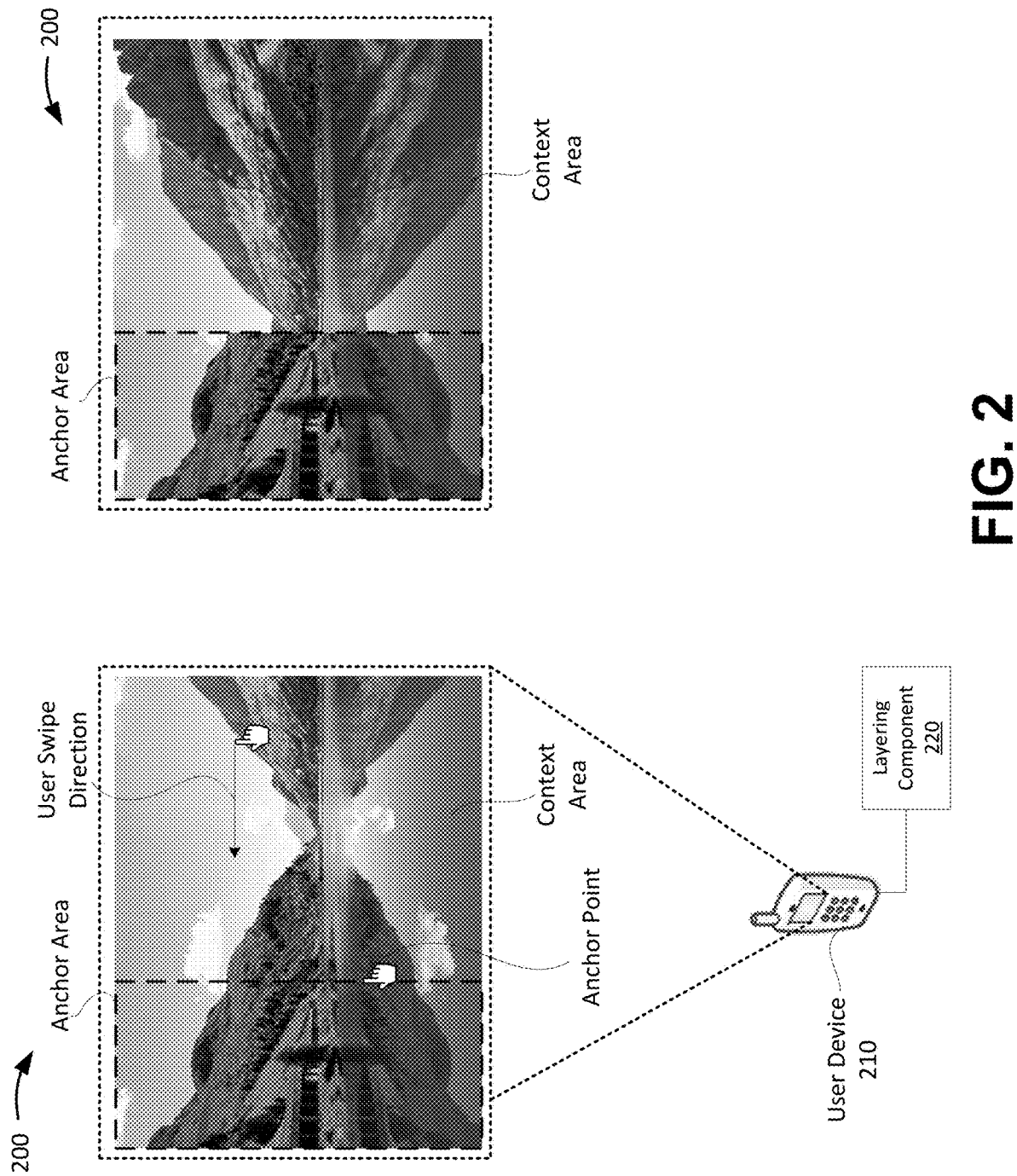
FIG. 2 shows an overview of an example implementation in accordance with aspects of the present invention

FIG. 2 shows an overview of an example implementation in accordance with aspects of the present invention. As shown in interface 200 of FIG. 2, a user device 210 may display a virtual object (e.g., an image). FIG. 2 illustrates a situation in which the size of the image is too large to display in its entirely within the display of the user device 210. Typically, a user may zoom out to view the entire image in its entirety (e.g., if the user wishes to view both ends or different sections of the image concurrently). However, doing so may thus result in certain details of the image being difficult to see. In accordance with aspects of the present invention, the user may view multiple sections of the image while the image is zoomed-in. For example, the user may input a first touch gesture to define an anchor point, as shown. In embodiments, the first touch gesture may be a point-touch gesture in which the user touches a point on the display of the user device 210 displaying the virtual object. Additionally, the first touch gesture may include a "long-press" or single touch input in which the user touches a single point on the display for a threshold period of time (e.g., three seconds, five seconds, etc.). Additionally, or alternatively, the first touch gesture may include a "multi-tap" gesture in which the user taps the point on the display a threshold number of times (e.g., three times). Based on receiving the first touch gesture input, a layering component 220 of the user device 210 may define an anchor point corresponding to a point on the virtual object in which the first touch gesture input was received. Also, the layering component 220 may define the context area corresponding to the boundaries of the image.

Once the anchor point has been defined, the user may input a second touch gesture (e.g., a "swipe" gesture) to scroll through the virtual object (or other content displayed on the user device 210) while maintaining the display of a section of the virtual object. In the example of FIG. 2, the user may swipe from right to left as shown. Once the user has provided the second touch gesture input, the layering component 220 may define a scrolling area and an anchor area. The layering component 220 may define the anchor area as the area on the image that is to remain fixed or anchored during subsequent scroll gesture inputs, and the scrolling area may include the area on the image through which the image may be scrolled. In embodiments, the layering component 220 may define the anchor area based on a direction of the second gesture input (e.g., the gesture of the swipe). For example, if the swipe direction right to left, the anchor area may include the area to the left of the anchor point and the scrolling area would include the right side of the anchor point such that right size of the anchor point may be scrolled with subsequent swipe gestures.

In the example shown in FIG. 2, the anchor area is fixed and the scrolling area may be scrolled such that the scrolling area is scrolled behind the anchor area. As further shown in interface 200 of FIG. 2, the anchor area remains in place as the scrolling area is scrolled. For example, as shown in interface 200 the far right end portion of the image is now viewable concurrently with a far left end of the image without the need to zoom out of the image.

As described in greater detail herein, aspects of the present invention may be applied to other types of virtual objects other than images. For example, aspects of the present invention may be applied to tables, spreadsheets, text documents, web pages, or the like.

Figure 3:
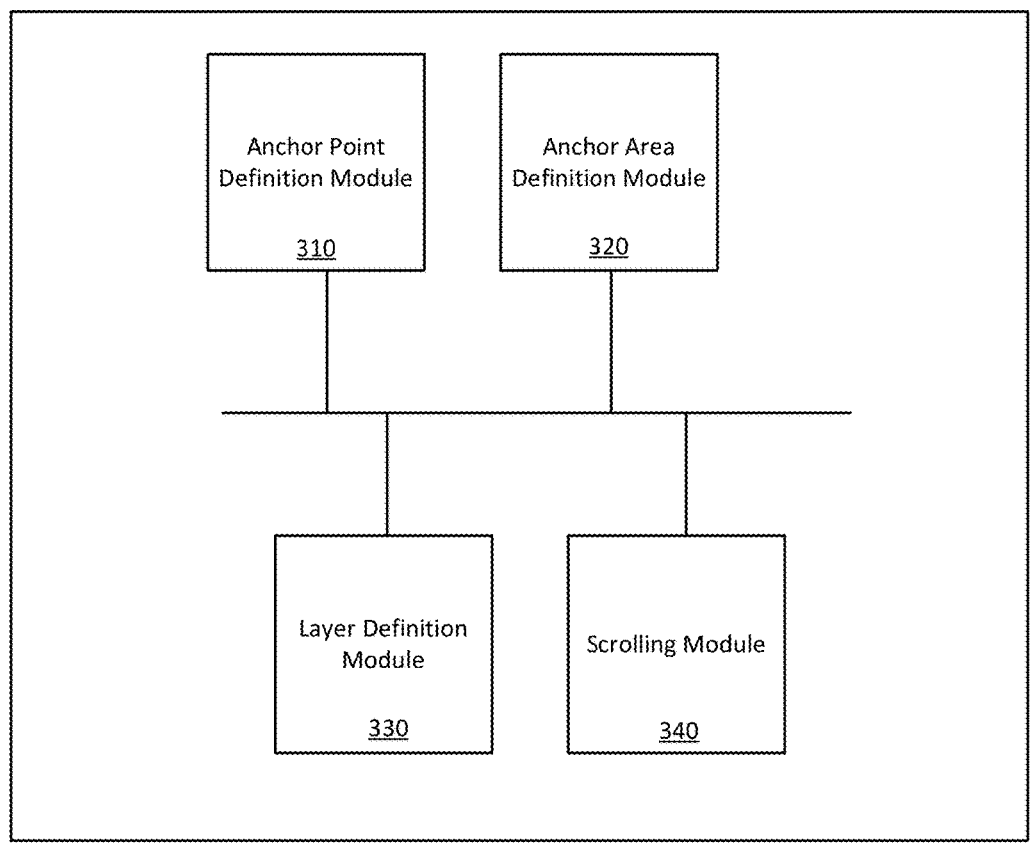
FIG. 3 shows a block diagram of example components of a layering component in accordance with aspects of the present invention.

FIG. 3 shows a block diagram of example components of a layering component 220 in accordance with aspects of the present invention. As shown in FIG. 3, the layering component 220 may include an anchor point definition module 310, an anchor area definition module 320, a layer definition module 330, and a scrolling module 340. In embodiments, the layering component 220 may include additional or fewer components than those shown in FIG. 3. In embodiments, separate components may be integrated into a single computing component or module. Additionally, or alternatively, a single component may be implemented as multiple computing components or modules.

The anchor point definition module 310 may include a program module (program module 42 of FIG. 1) that receives a first user input (e.g., a first touch gesture or an anchor point selection gesture) used to define an anchor point for a virtual object. For example, the anchor point definition module 310 may receive a first touch gesture including a point-touch gesture of a threshold duration and/or a multi-tap gesture with a threshold number of taps. Based on receiving the first touch gesture, the anchor point definition module 310 may identify a context area or a boundary of a virtual object within the display coordinates of the first touch gesture. As described herein, the context area may be based on a type of the virtual object. For example, the context area for a table may include the bounds of the table (e.g., a boundary in which the table includes data). As another example, the context area for an image may include the bounds of the image. In embodiments, the anchor point may identify screen coordinates corresponding to the location on the display of the user device 210 of the first touch gesture.

The anchor area definition module 320 may include a program module (program module 42 of FIG. 1) that may receive a second gesture input to define an anchor area. As described herein, the second gesture input may be a swipe gesture used to scroll through the virtual object. In embodiments, the anchor may be the area to the left, right, above, or below a delimiter or anchor point (e.g., based on the direction of a swipe input after anchor area has been defined). The anchor area definition module 320 may also define a scrolling area as the area opposite of the anchor area.

As described herein, the anchor area definition module 320 may define the anchor area based on a delimiter within a context area and corresponding to the anchor point. Examples of delimiters may include column breaks or row breaks in a spreadsheet or table, punctuation or special characters in a text document (e.g., log document, XML document, JSON document, etc.), boundary information for an image or web page, or the like. As described herein, a delimiter may be identified based on the anchor point. For example, a delimiter may correspond to row or column breaks in a table associated with a first touch input (e.g., a touch input for selecting an anchor point). For a text document, a delimiter may include a character or punctuation (e.g., a comma, semicolon, etc.) associated with the first touch input.

For certain types of virtual objects, the anchor area may be to the left, right, above, or below the delimiter. For example, for a table or spreadsheet, the anchor area may be based on a row and column break corresponding to row and column in which the first touch gesture (e.g., anchor point touch) is received. For a text document, the anchor area may be based on a character or punctuation corresponding to a delimiter (e.g., above, below, left of, or right of a comma, semicolon, etc.). In embodiments, additional pattern matching techniques may be employed for identifying delimiters. For example, pattern matching techniques may be used to identify that subsequent lines within a "context area" are comma separated (as with comma separated values (CSV) data). Additionally, or alternatively, pattern matching techniques may be to identify that data conforms to a JSON structure, an XML structure, or the like, and delimiters may be determined based on these structures. In embodiments, an anchor area may be defined only based on the anchor point, without consideration of a delimiter (e.g., in the case of an image that may not include a delimiter). In embodiments, the anchor area definition module 320 may identify a delimiter based on a swipe direction of the second touch gesture. For example, the anchor area definition module 320 may identify a line break delimiter when a vertical swipe gesture is received, and may identify a column break or punctuation separator if a horizontal gesture is received. In embodiments, the anchor area definition module 320 may identify a delimiter as a line perpendicular to display coordinate of an anchor point (e.g., coordinates for a location in which the first touch gesture is received) and coordinates of the second gesture.

The layer definition module 330 may include a program module (program module 42 of FIG. 1) that may define or generate layers based on defining the anchor area and the scrolling area. For example, the layer definition module 330 may generate a layer corresponding to the anchor area and a second layer corresponding to the scrolling area. The layer definition module 330 may also define an order of the layers such that the anchor area is above the scrolling area. In this way, the scrolling area will be behind the anchor area as the user scrolls through the scrolling area. Further, the layer definition module 330 may "freeze" the anchor area such that the anchor area continues to be displayed while the user scrolls through the scrolling area.

The scrolling module 340 may include a program module (program module 42 of FIG. 1) that may receive subsequent scrolling inputs (e.g., swipe gesture inputs) from a user of the user device 210. The scrolling module 340 may scroll through the scrolling area in accordance with the subsequent scrolling inputs such that the scrolling area is placed behind the anchor.

Figure 4:
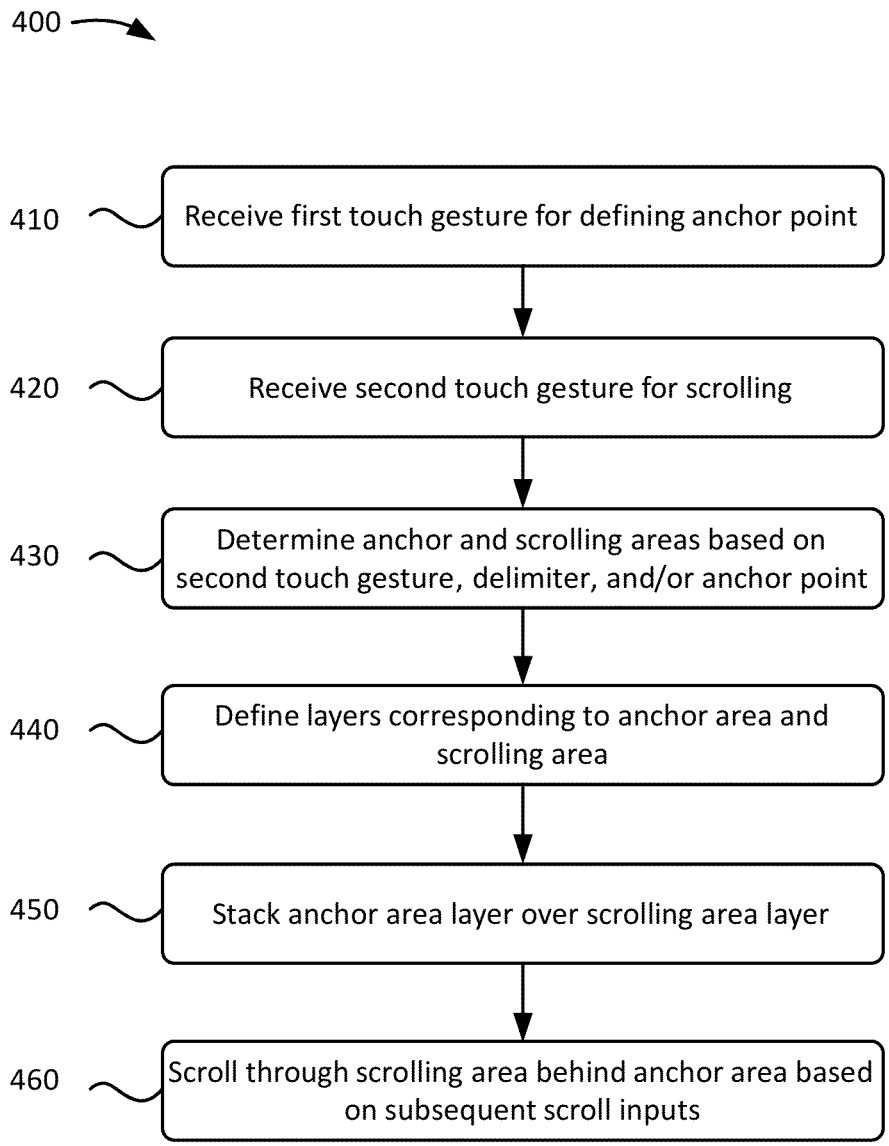
FIG. 4 shows an example flowchart for defining multiple layers using touch gestures in accordance with aspects of the present invention.

FIG. 4 shows an example flowchart for defining multiple layers using touch gestures in accordance with aspects of the present invention. The steps of FIG. 4 may be implemented in the environment of FIG. 2, for example, and are described using reference numbers of elements depicted in FIG. 2. As noted above, the flowchart illustrates the architecture, functionality, and operation of possible implementations of systems, methods, and computer program products according to various embodiments of the present invention.

As shown in FIG. 4, process 400 may include receiving a first touch gesture for defining an anchor point (step 410). For example, as described above with respect to the anchor point definition module 310, the layering component 220 may receive a touch gesture for defining an anchor point. In embodiments, the layering component 220 may receive a first touch gesture (e.g., from a user of the user device 210) including a point-touch gesture of a threshold duration and/or a multi-tap gesture with a threshold number of taps.

Based on receiving the first touch gesture, the layering component 220 may identify a context area or a boundary of a virtual object within the display coordinates of the first touch gesture. As described herein, the context area may be based on the type of virtual object. As described herein, the layering component 220 may define the anchor point based on delimiters which may vary based on the type of virtual object.

Process 400 may further include receiving a second touch gesture for scrolling (step 420). For example, as described above with respect to the anchor area definition module 320, the layering component 220 may receive a second touch gesture (e.g., a swipe gesture used to scroll through the virtual object).

Process 400 may also include determining anchor and scrolling areas based on the second touch gesture, delimiter, and/or anchor point (step 430). For example, as described above with respect to the anchor area definition module 320, the anchor may be defined as the area to the left, right, above, or below a delimiter or anchor point (e.g., based on the direction second touch gesture). As an example, the anchor area may be defined as an area to the left of an anchor point or delimiter when the second touch gesture is a swipe gesture from right to left. The layering component 220 may also define a scrolling area that includes the remaining area of the virtual object (e.g., the difference between the context area and the anchor area).

Process 400 may further include defining layers corresponding to the anchor area and scrolling area (step 440). For example, the layering component 220 may generate a first layer corresponding to the anchor area, and a second layer corresponding to the scrolling area. The layering component 220 may generate the first and second layers using any software-based layer generating techniques.

Process 400 may further include stacking the anchor area layer over the scrolling area layer (step 450). For example, the layering component 220 may stack the anchor area layer (e.g., the first layer) over the scrolling area layer (e.g., the second layer). In embodiments, the layering component 220 may stack the layers such that anchor area layer is maintained above the scrolling area layer (e.g., the position of the anchor area layer is maintained in place).

Process 400 may also include scrolling through the scroll area behind anchor area based on subsequent scroll inputs (step 460). For example, as described above with respect to the scrolling module 340, the layering component 220 may receive subsequent scrolling inputs (e.g., swipe gesture inputs) from a user of the user device 210. The layering component 220 may scroll through the scrolling area in accordance with the subsequent scrolling inputs such that the scrolling area is placed behind the anchor. In this way, multiple sections of a virtual object can be viewed on a user device 210 having a limited viewing or display size.

As described herein, the layering component 220 may create and/or manipulate layers on the user device 210 by defining an anchor point corresponding to coordinates of a first touch gesture. The layering component 220 may further define a context area corresponding to bounds of a virtual object overlapping the coordinates of the first touch gesture. The layering component 220 may receive a second touch gesture (e.g., a swipe gesture) to define an anchor area and scrolling area based on the direction of the swipe gesture. The layering component 220 may generate layers corresponding to the anchor area and scrolling area such that the anchor area is elevated above the scrolling area. In this way, the scrolling area may remain behind the anchor area as the scrolling area is scrolled.

Figure 5:
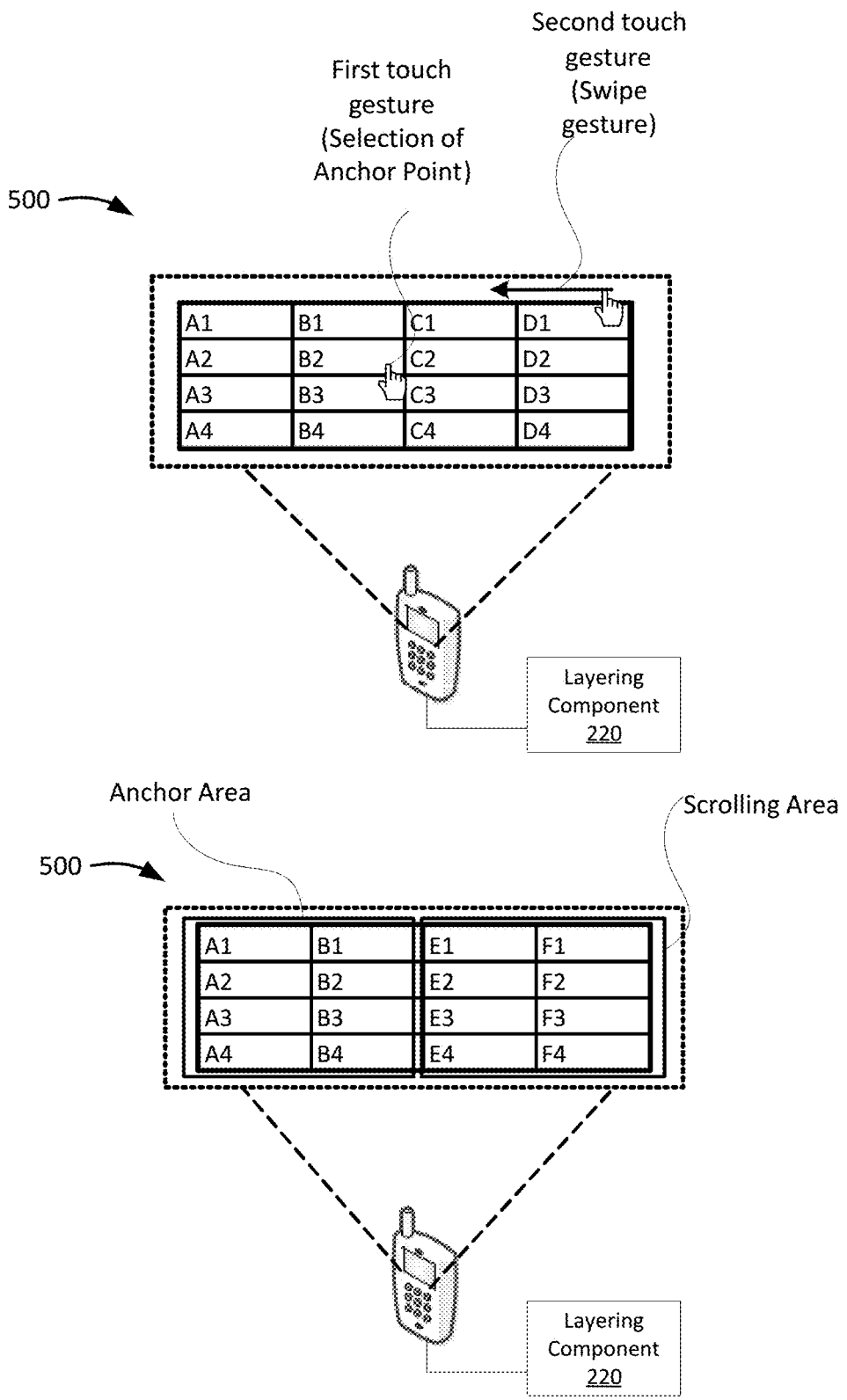
FIG. 5 shows an example implementation in accordance with aspects of the present invention.

FIG. 5 shows an example implementation in accordance with aspects of the present invention. As shown in interface 500 of FIG. 5, a user may input a first touch gesture to select an anchor point on a table (e.g., via a touch screen of a user device 210). As further shown in FIG. 5, the user may input a second touch gesture (e.g., a swipe gesture from right to left). Based on receiving the first touch gesture and the second touch gesture, the layering component 220 may define an anchor area and scrolling area. For example, the layering component 220 may define a delimiter as a column break in the table. As shown in interface 500 the anchor area may be defined as the first two left hand columns (e.g., the area to the left of the delimiter), and the scrolling area may be defined as the columns to the right of the anchor area. As further shown in interface 500, the scrolling area may be scrolled to reveal additional rows and columns in the table behind the anchor area. In this way, data from columns A and B remain visible while data from columns E and F are now concurrently visible without the need to zoom out to concurrently view data that is on opposite ends of the table.

Figure 6:
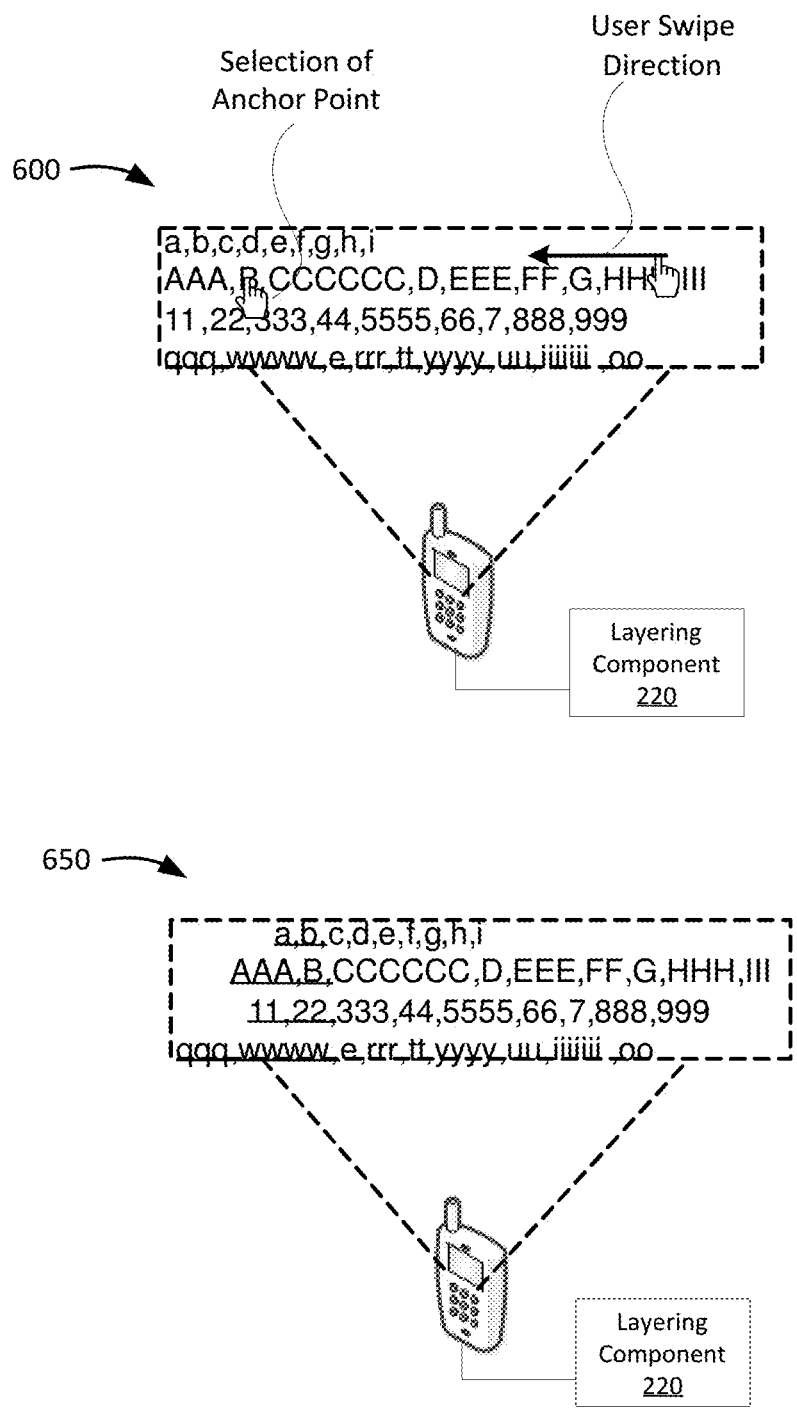
FIG. 6 shows an example implementation in accordance with aspects of the present invention.

FIG. 6 shows an example implementation in accordance with aspects of the present invention. As shown in interface 600 of FIG. 6, a user may input a first touch gesture to select an anchor point on a text document having delimiters in the form of punctuation (e.g., a comma-delimited document, a CSV document, etc.). As further shown in FIG. 6, the user may input a second touch gesture (e.g., a swipe gesture from right to left). Based on receiving the first touch gesture and the second touch gesture, the layering component 220 may define an anchor point, context area, a delimiter, and an anchor area. For example, the layering component 220 may define the anchor point as the capital letter "B" in the second line of text, the context area as the four lines of text, the delimiter as the comma following the "B" in the second line of text (e.g. the second comma in the line of text), and the anchor area as the text shown before the second comma on each line (e.g., the underlined text in interface 650). In embodiments, the layering component 220 may also analyze the context area to identify a commonality between text/data in the lines. For example, the layering component 220 may identify that the data conforms to a CSV structure and thus, the delimiters are commas. As another example, the layering component 220 may identify that the data conforms to JSON structure and may identify delimiters based on a JSON format (e.g., the characters "{" and "}" may be identified as delimiters. Additionally, or alternatively, the layering component 220 may identify other delimiters as other punctuation/characters based on the commonality in lines of text. As shown in interface 650 the lines of text may be modified to align with the delimiter. In this way, text data may be more easily aligned based on the position of delimiters in a text document. Further, the anchor area may include the area to the left of the second comma following the alignment, such that text to the right would scroll beneath the anchor area.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a user device, a first touch gesture at a display of the user device visually displaying a virtual object;
determining, by the user device, a type of the virtual object;
defining, by the user device, an anchor point of the virtual object visually displayed on the display based on the first touch gesture and an associated delimiter, wherein the delimiter is selected based on the type of the virtual object;
receiving, by the user device, a second touch gesture at the display;
defining, by the user device, an anchor area and a scrolling area based on the anchor point, the delimiter and a direction of the second touch gesture;
defining, by the user device, a first layer corresponding to the anchor area and a second layer corresponding to the scrolling area; and
stacking, by the user device, the first layer over the second layer.

2. The method of claim 1, further comprising:
receiving a subsequent swipe gesture after receiving the second touch gesture; and
scrolling the scrolling area behind the anchor area based on receiving the subsequent swipe gesture.

3. The method of claim 1, wherein the first touch gesture is selected from a group consisting of:
a single touch input having a duration satisfying a threshold;
a multi-touch input; and
a pressure-sensitive touch input.

4. The method of claim 1, wherein the second touch gesture includes a swipe gesture.

5. The method of claim 1, further comprising defining a context area based on the anchor point.

6. The method of claim 5, wherein the context area includes bounds of the virtual object.

7. The method of claim 6, wherein the scrolling area and the anchor area are within the context area.

8. The method of claim 5, wherein:
the type of the virtual object is determined based on identifying a commonality between data in lines of text;
the first touch gesture comprises the user touching a single point on the display for a threshold period of time;
a boundary defining the anchor area is based on the delimiter; and
the delimiter is selected from a group consisting of:
a row or column break in a table;
a punctuation in a line of text;
a character in a line of text;
boundary information for an image; and
boundary information for a web page.

9. The method of claim 1, wherein the delimiter is selected from a group consisting of:
a row or column break in a table; and
a punctuation or character in a line of text.

10. The method of claim 1, wherein a service provider at least one of creates, maintains, deploys and supports the computing device.

11. The method of claim 1, wherein steps of claim 1 are provided by a service provider on a subscription, advertising, and/or fee basis.

12. The method of claim 1, further comprising deploying a system for creating and manipulating layers on the user device using touch gestures, comprising providing a computer infrastructure operable to perform the steps of claim 1.

13. A computer program product for creating and manipulating layers on a user device using touch gestures, the computer program product comprising a computer readable storage medium having program instructions embodied therewith, the program instructions executable by the user device to cause the user device to:
receive a first touch gesture on a display of the user device displaying a virtual object;
determine a type of the virtual object;
define an anchor point based on display coordinates corresponding to a location on the display in which the first touch gesture is received and an associated delimiter, wherein the delimiter is selected based on the type of the virtual object;
receive a second touch gesture for scrolling through content displayed on the user device;
defining an anchor area and a scrolling area based on the anchor point the delimiter and a direction of the second touch gesture;
define a first layer corresponding to the anchor area and a second layer corresponding to the scrolling area; and
stack the first layer over the second layer.

14. The computer program product of claim 13, wherein the program instructions further cause the user device to:
receive a subsequent swipe gesture after receiving the second touch gesture; and
scroll the scrolling area behind the anchor area based on receiving the subsequent swipe gesture.

15. The computer program product of claim 13, wherein the first touch gesture is selected from a group consisting of:
a single touch input having a duration satisfying a threshold;
a multi-touch input; and
a pressure-sensitive touch input.

16. The computer program product of claim 13, wherein the program instructions further cause the user device to define a context area based on the anchor point, wherein the context area includes bounds of the virtual object.

17. The computer program product of claim 16, wherein the scrolling area and the anchor area are within the context area.

18. The computer program product of claim 13, wherein the virtual object includes the delimiter, and the delimiter defines a boundary based upon which the anchor area is defined, wherein the delimiter is selected from a group consisting of:
a row or column break in a table; and
a punctuation or character in a line of text.

19. A system comprising:
a CPU, a computer readable memory and a computer readable storage medium associated with a user device;
program instructions to receive a first touch gesture at a display of the user device displaying a virtual object;
program instructions to determine a type of the virtual object;
program instructions to define an anchor point based on the first touch gesture and an associated delimiter, wherein the delimiter is selected based on the type of the virtual object;
program instructions to receive a second touch gesture including a swipe gesture for scrolling a portion of a virtual object presented on the user device;
program instructions to define an anchor area and a scrolling area based on the anchor point, the delimiter, and a direction of the swipe gesture;
program instructions to define a first layer corresponding to the anchor area and a second layer corresponding to the scrolling area;
program instructions to stack the first layer over the second layer;
program instructions to receive a subsequent swipe gesture after receiving the second touch gesture; and
program instructions to scroll the scrolling area behind the anchor area based on receiving the subsequent swipe gesture,
wherein the program instructions are stored on the computer readable storage medium for execution by the CPU via the computer readable memory.

20. The system of claim 19, further comprising program instructions to define a context area based on the anchor point, wherein the context area includes bounds of the virtual object and the scrolling area and the anchor area are within the context area.

* * * * *